United States Patent [19]
Prestele

[11] Patent Number: 5,287,649
[45] Date of Patent: Feb. 22, 1994

[54] GRID PLATE

[76] Inventor: Eugen Prestele, Albert-Greiner-Strasse 73, D-8900 Augsburg/FRG, Fed. Rep. of Germany

[21] Appl. No.: 894,612

[22] Filed: Jun. 5, 1992

[30] Foreign Application Priority Data

Jun. 7, 1991 [AT] Austria .................. 1154/91

[51] Int. Cl.⁵ .................. A01G 9/02; E01C 5/20
[52] U.S. Cl. .................. 47/33; 47/83; 404/36
[58] Field of Search .................. 404/70, 36; 47/33, 83; 52/660

[56] References Cited

U.S. PATENT DOCUMENTS

| | | | |
|---|---|---|---|
| 4,111,585 | 9/1978 | Mascaro | 404/36 X |
| 4,118,892 | 10/1978 | Nakamura et al. | 47/33 X |
| 4,621,942 | 11/1986 | Hill | 404/36 X |
| 4,671,699 | 6/1987 | Roach | 404/36 X |

Primary Examiner—William P. Neuder
Attorney, Agent, or Firm—Pascal & Associates

[57] ABSTRACT

A grid plate is comprised of a base and vertical one piece side walls which form chambers open to the top, the bottom of each chamber being provided with a drainage hole and the bottom having projections on a plate rim which protrude beyond the rim of the grid plate and grip the bottom area of an adjacent grid plate, the plate rim of the grid plate intersecting at least every second rim-bordering chamber, the chambers forming additional chambers with side walls of adjacent grid plates and the side walls of a pair of grid plates only coming into contact along their vertical edges.

17 Claims, 7 Drawing Sheets

FIG. I

GRID PLATE

FIELD OF THE INVENTION

The invention relates to a grid plate for retaining soil in which grass or the like can be grown.

BACKGROUND TO THE INVENTION

This type of a grid plate is the subject of U.S. Pat. No. 4,111,585, and is equipped With a bottom and vertical one-piece side walls which are arranged like the walls of a honeycomb, creating hexagonal chambers open toward the top. The bottom of each chamber is provided with a circular drainage hole. Grid plates of this type are used to sow grass by filling the chambers with soil. The grass takes root in the subsoil through the drainage holes.

To sow grass over larger areas, the grid plates are arranged side by side, wherein the rim-bordering side walls of adjacent plates contact one another. To prevent the grid plates from shifting, projections in the form of detents are provided on the plate rim at the bottom which protrude beyond the rim-bordering side walls and engage in detent recesses at the bottom of adjacent grid plates. Along an edge of the plate, detents and recesses alternate. The detents grip into the recesses of the adjacent grid plate from below.

To permit the grass to take root between adjoing chambers, the side walls are provided with slots on the upper part thereof.

These grid plates have a number of disadvantages. Since the peripheral side walls of adjacent plates must lie flush against one another, their proper placement is prevented when stones and soil enter between adjacent side walls. These stones and the soil must be removed as it is otherwise not possible for adjacent grid plates to come to rest against one another. Since the detents and recesses alternate along the plate rim, adjacent plates must be tilted so that the detents of one plate interlock in the recesses of the other plate and vice versa. A further disadvantage is that the slots on the upper part of the side walls are sharp-edged and could, therefore, cause injuries.

SUMMARY OF THE INVENTION

An object of the invention is to construct the grid plates in such a way that adjacent plates can be easily installed without the possibility of obstruction by stones and soil.

In accordance with an embodiment of the invention, a grid plate is comprised of a base and vertical one-piece side walls which form chambers open to the top, the bottom of each chamber being provided with a drainage hole and the bottom having projections on a plate rim which protrude beyond the rim of the grid plate and grip the bottom area of an adjacent grid plate, the plate rim of the grid plate intersecting at least every second rim-bordering chamber, the chambers forming additional chambers with side walls of adjacent grid plates and the side walls of a pair of grid plates only coming into contact along their vertical edges.

BRIEF INTRODUCTION TO THE DRAWINGS

Embodiments of the invention are described in greater detail below with reference to the following drawings, in which:

FIG. 1 is a top view of the peripheral areas of three adjacent grid plates prior to joing thereof, FIG. 2 is a top view corresponding to FIG. 1, with joined plates, FIG. 3 is a top view of a chamber formed by two partial chambers of adjacent grid plates, FIG. 4 is a vertical section along the line IV—IV in FIG. 3, FIG. 5 is a section through a chamber, FIG. 6 is a side view of the upper part of a chamber, FIG. 7 is a view corresponding to FIG. 3, in a further embodiment of the invention, FIG. 8 is a vertical section along the line VIII—VIII in FIG. 7, FIG. 9 is a top view onto a chamber in a further embodiment of the invention, FIG. 10 is a vertical section along the line X—X in FIG. 9, FIG. 11 is a further embodiment of the peripheral areas of two grid plates, and FIG. 12 is a third embodiment of a peripheral area.

DETAILED DESCRIPTION OF THE INVENTION

Figure 1:
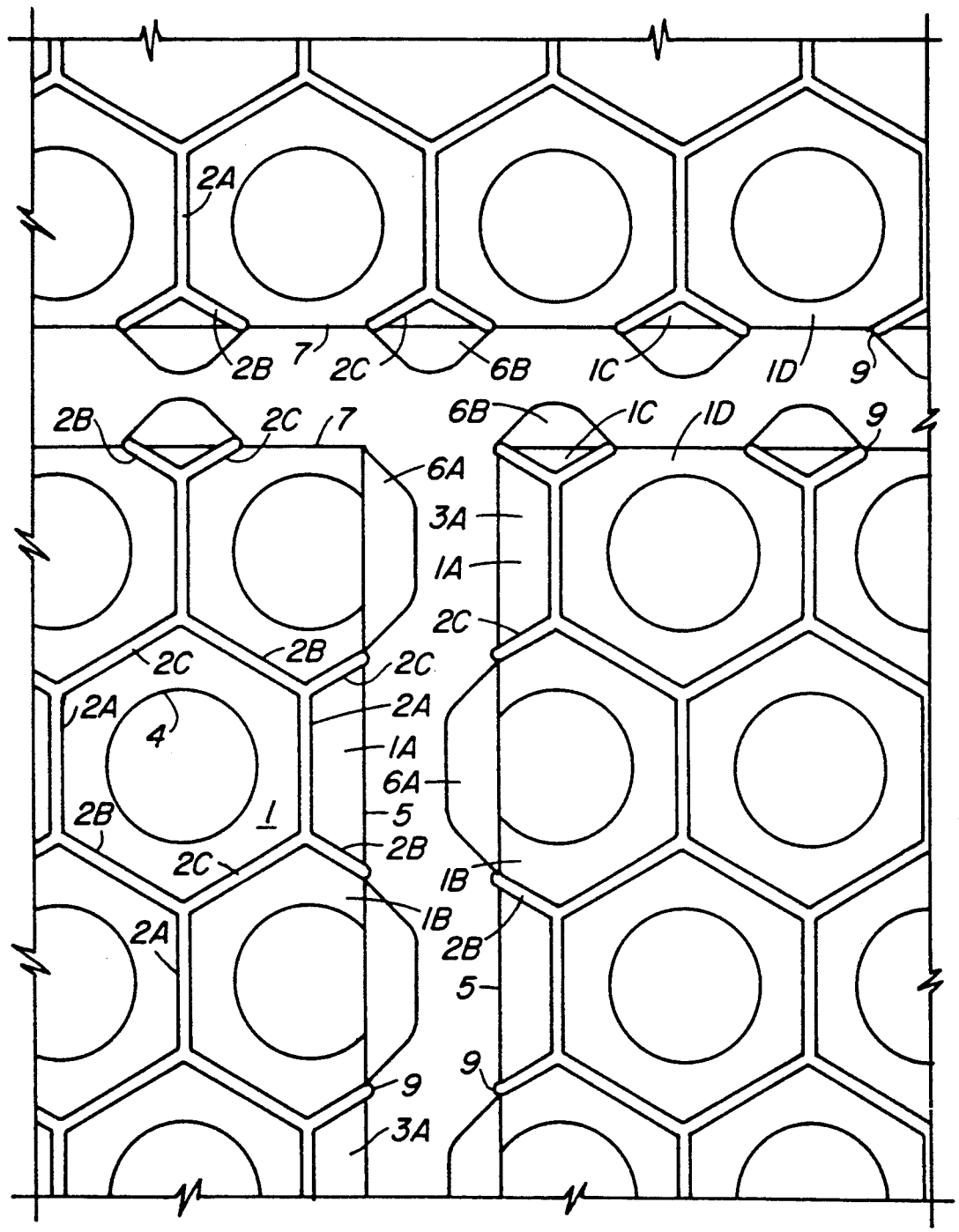
Figure 2:
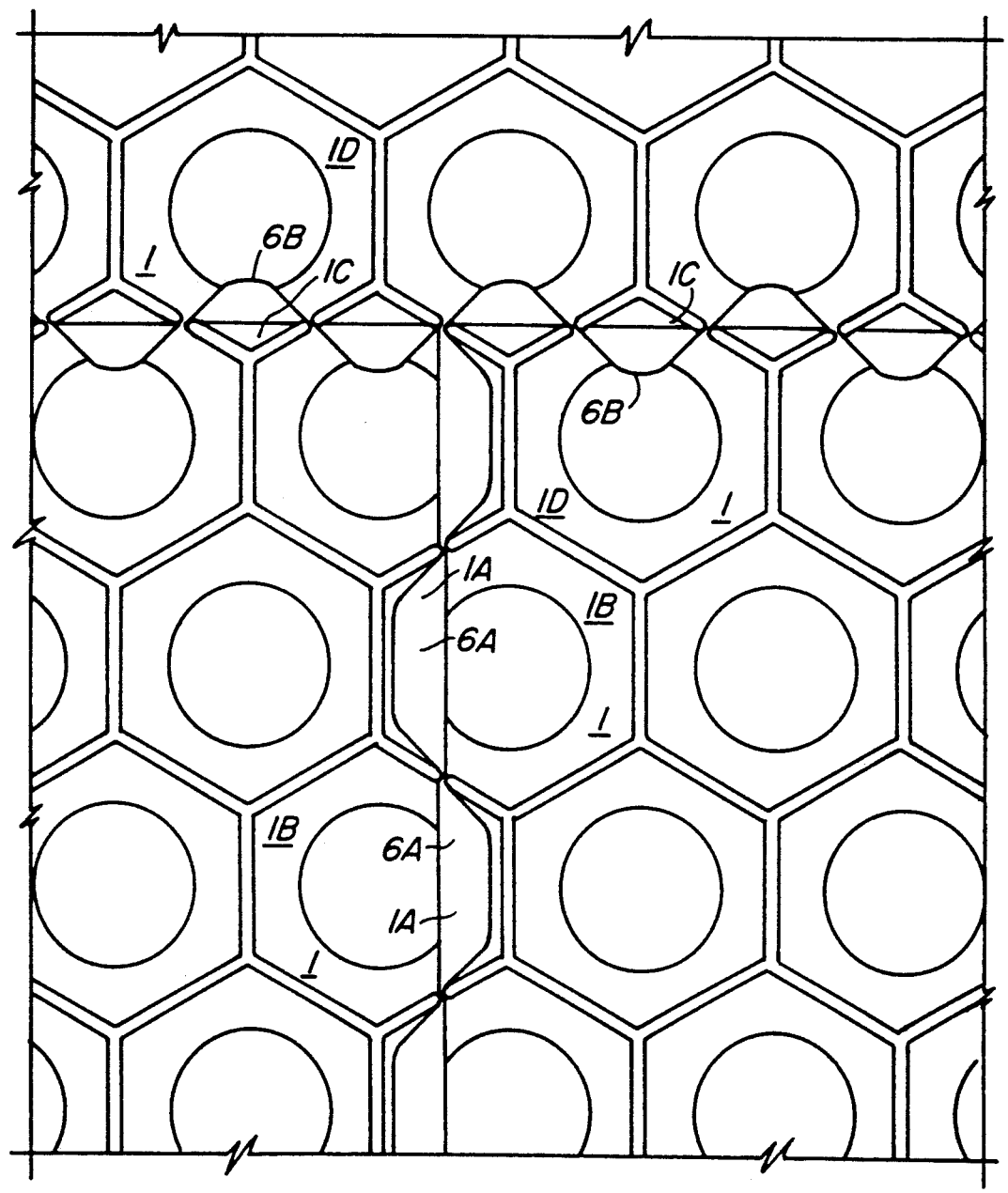

FIGS. 1 and 2 show the peripheral areas of three adjoining grid plates. In addition to these peripheral areas, the grid plates have hexagonal chambers which are open towards the top and are formed by the six vertical side walls 2A, 2B and 2C as well as base 3 which has a circular drainage opening. This creates a honeycomb-like structure of the grid plates. The two opposite rims 5 of the grid plates each intersect the side walls 2B and 2C extending diagonally thereto at a distance from the side wall 2A which is parallel to rim 5. Partial chambers 1A and 1B are formed in this way along rim 5, whereby the small partial chambers 1A alternate with the large partial chambers 1B along rim 5. Along the plate rim 5, projections 6A are molded on in the large partial chambers 1A which are contoured to match the shape of the small chambers 1A and project beyond the rim 5. The rim 5 is spaced from the side wall 2A of the small partial chamber 1A. Thus, the distance of rim 5 from a side wall 2A of a large partial chamber 1B corresponds to the distance between two adjacent side walls 2A minus the distance of rim 5 from a side wall 2A of a small partial chamber 1A.

Figure 3:
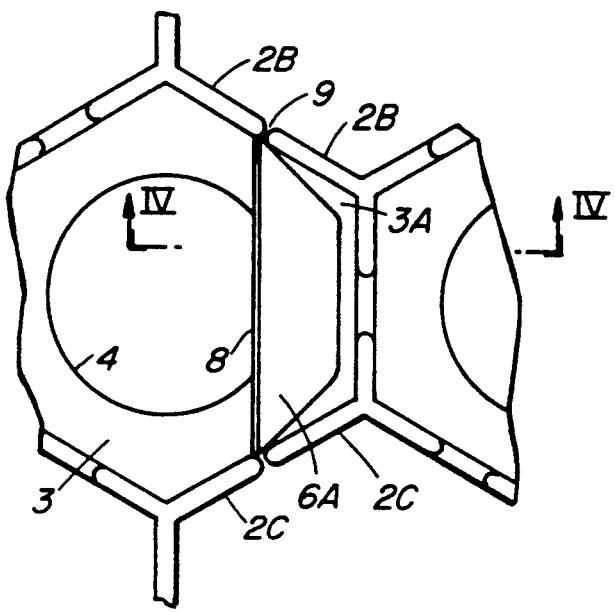
Figure 4:
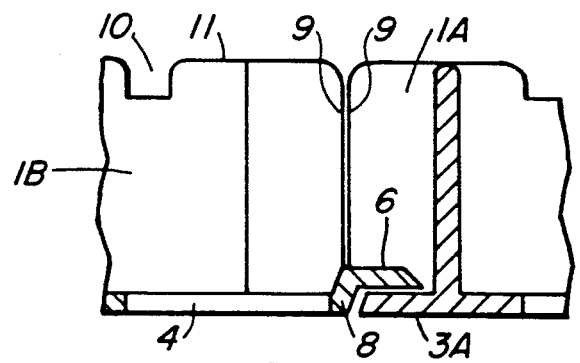
Figure 5:
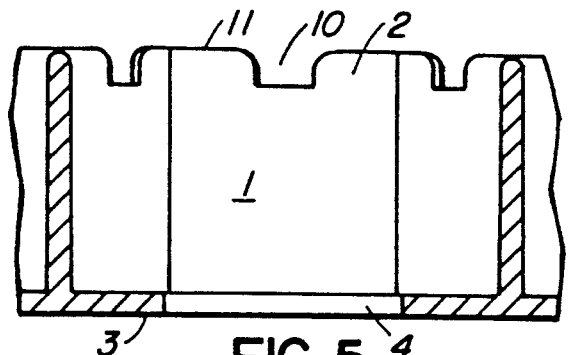

Along the two other rims 7, which extend at right angles to rims 5, the diagonal side walls 2B and 2C are also cut at a distance from the side walls 2A which are at right angles to rim 7. This forms the partial chambers 1C and 1D which alternate. Projections 6B are also molded on to the small partial chambers 1C at the base. As can be seen in FIGS. 3 and 4, projections 6A and 6B are bent upward at their base, whereby the angle is designated by 8. The height of the angle is always slightly greater than the thickness of the base 3.

When the two lower base plates in FIG. 1 are joined along their rims 5, then the opposite partial chambers 1A and 1B each form a chamber 1. In each case, projection 6A overlaps the base area 3A of the opposite small partial chamber 1A. In a vertical view, the side walls 2 of the adjoining grid plates only touch along the vertical edges 9 of the side walls 2B and 2C intersected by rims 5. Since these edges are, moreover, rounded, stones and soil do not obstruct the grid plate installation.

Since the two grid plates are interlocked along rims 5 via projections 6A, a firm anchoring of the individual plates results which prevents lateral shifting. Since the projections 6A of both grid plates overlap the respective opposite base area 3A, a displacement in height between the grid plates is prevented.

The situation is the same when the upper grid plate in FIG. 1 is joined to the lower grid plates. In this case, the large partial chambers 1B and the opposite small partial chambers 1C each overlap the base area of the opposite partial chamber 1D. In vertical direction, contact also exists along edges 9.

Figure 6:
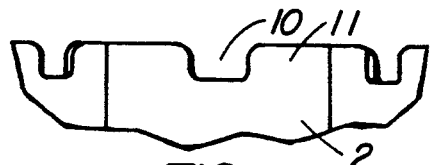

The side walls 3 are provided with slots 10 at the top, which each establish a connection between the adjoining chambers 1. The edges between the slots 10 and the upper parts 11 of side walls 2 are rounded, whereby rounded edges can also be provided at the base of slots 10, as shown in FIG. 6. In addition, the transitions between vertical edges 9 and upper parts 11 are rounded, as shown in FIG. 4. The danger of injury is greatly reduced by these roundings. The slots 10 enable roots to pass from one chamber 1 to the other chamber 1 and are, moreover, with respect to their base, a gauge for the amount of humus to be filled in the chambers 1.

Figure 7:
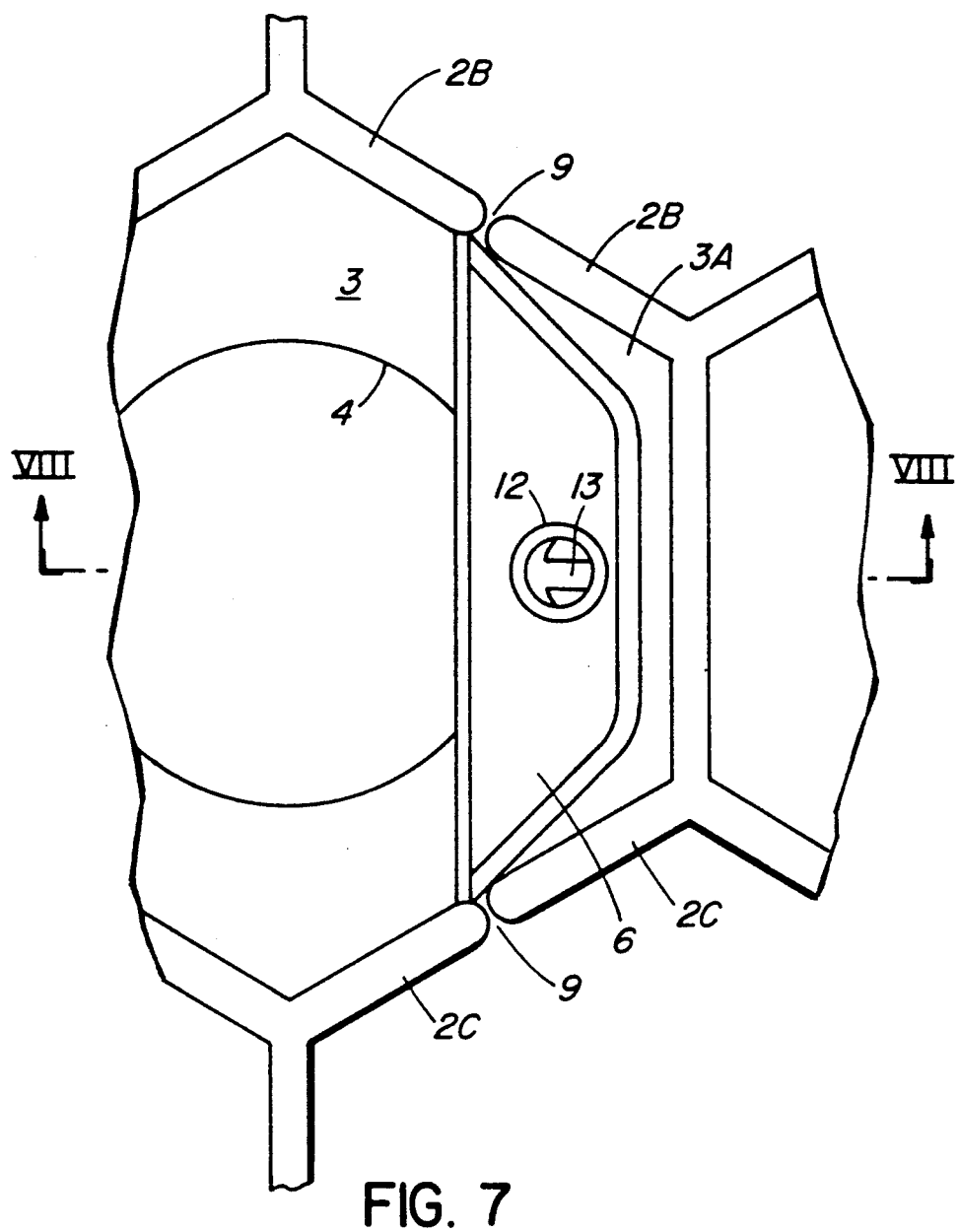
Figure 8:
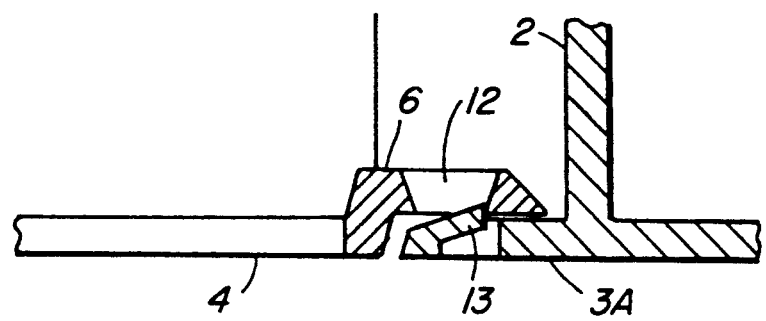

In the embodiment shown in FIGS. 7 and 8, the projections 6 are each interlocked with the base area 3A of the opposite partial chamber of the adjoining grid plate. For this purpose, the projection 6 has a downward tapered bore 12 with which a flexible detent 13 interlocks which is molded onto the base area 3A. Since bore 12 tapers conically downward, the flexible detent 13 spreads in bore 12 when the grid plates are forced apart. This is essentially different from the prior art in which the detents turn downward under the effect of such forces.

Figure 9:
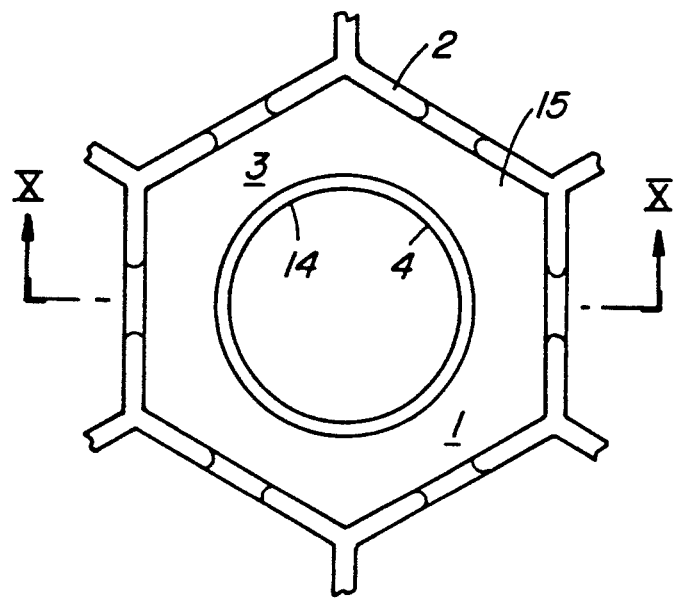
Figure 10:
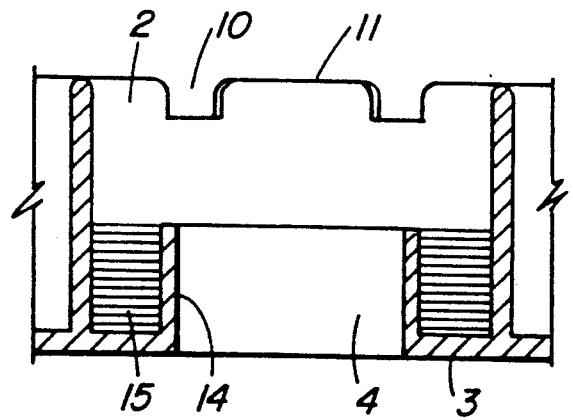

In the embodiment shown in FIGS. 9 and 10, the drainage hole 4 is surrounded by a vertical wall 14, the height of which is less than the height of the side walls 2. A moisture reservoir 15 is thus formed between wall 14 and the side walls 2. As a result, the grid plates can also be used in arid zones and for sowing on flat and sloping roofs.

Figure 11:
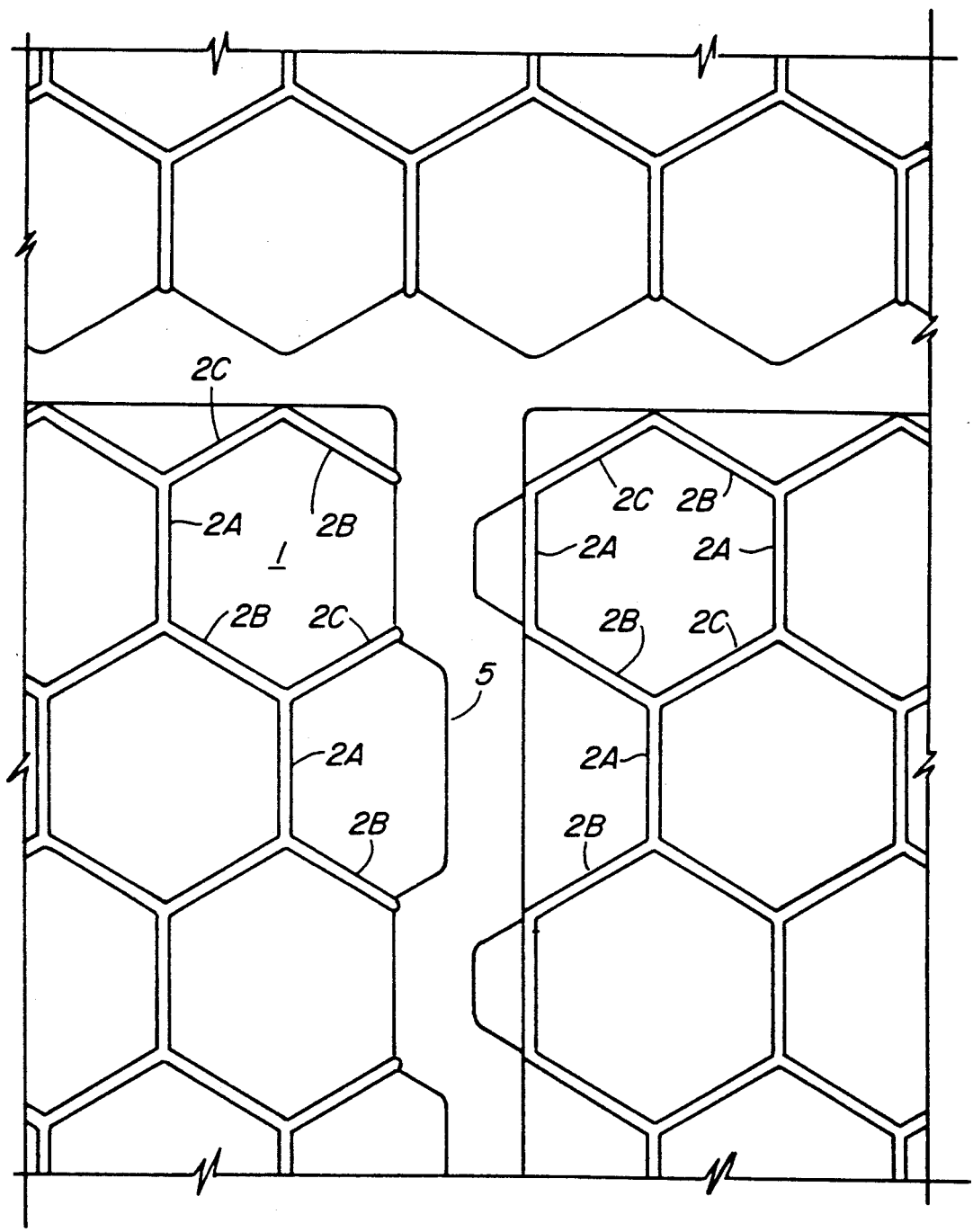
Figure 12:
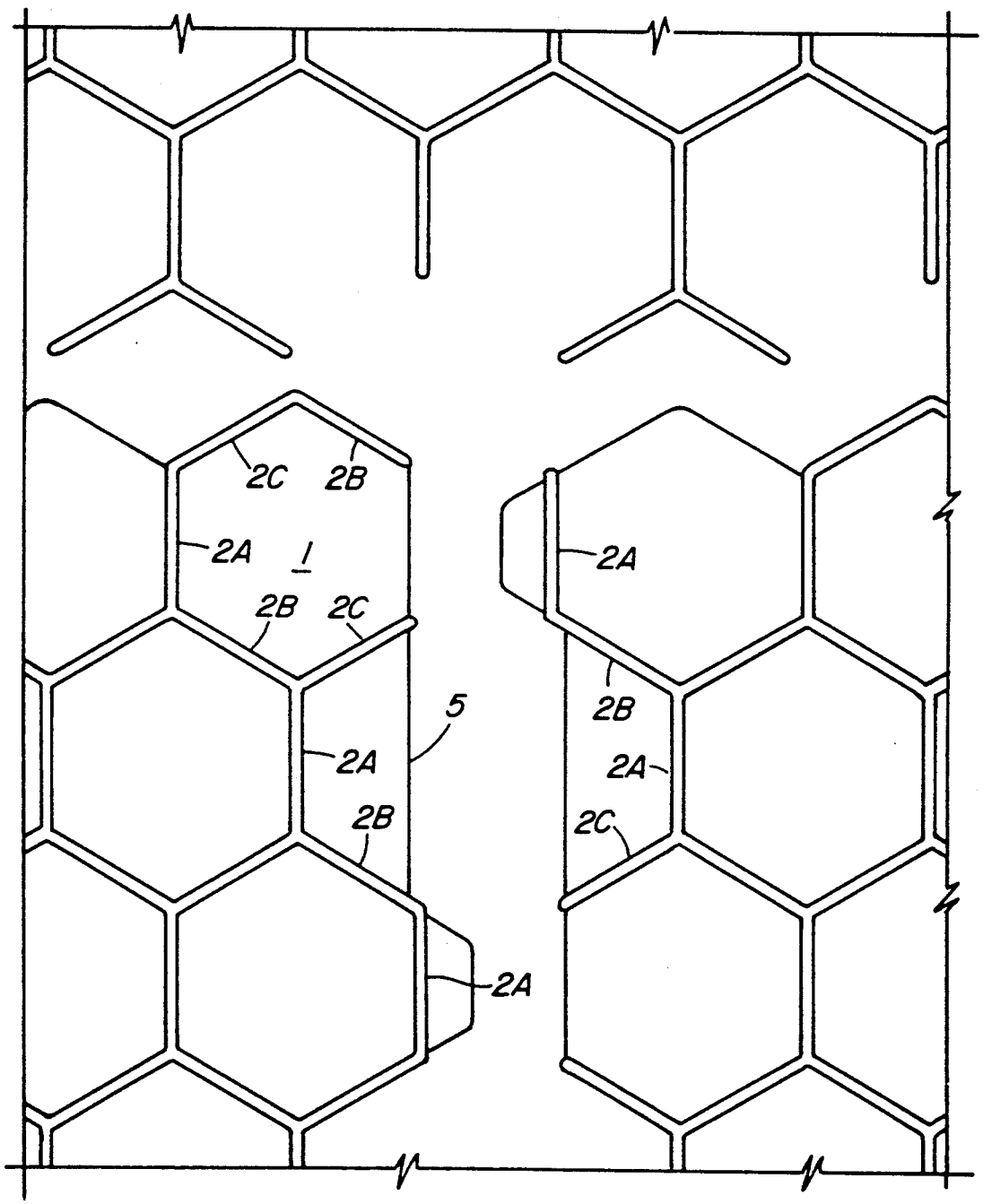

FIGS. 11 and 12 show alternative constructions of the peripheral areas of two adjacent grid plates which also ensure that side walls of adjacent grid plates do not come into contact.

In the embodiment of FIG. 11, rim 5 extends in the grid plate on the left in such a way that the side wall 2A is cut off in every second chamber 1, and the partial chamber between each of them is half as large as chamber 1.

Along the rim of the adjacent grid plate, every second chamber is comprised of a chamber 1 which is closed laterally by the side walls 2, whereas the partial chambers between them are half as large as a chamber 1. When the grid plates are joined, the partial chambers between them of adjacent grid plates form a chamber 1, whereas the laterally open chambers of the one grid plate are closed by the side walls 2A of the adjacent grid plate.

In the grid plates shown in FIG. 12, a laterally closed chamber, a partial chamber and a laterally open chamber alternate along rim 5. The partial chambers of adjacent grid plates form a chamber 1 and the laterally open chambers are each closed by the side wall 2A of the respective other grid plate.

I claim:

1. A grid plate comprising a base and vertical side walls integral to the base which form chambers open to the top, the bottom of each chamber being provided with a drainage hole and the base having projections on a plate rim which protrude beyond the plate rim and grip the base area of an adjacent grid plate, the plate rim of the grid plate intersecting the rim-bordering side walls of at least every second rim-bordering chamber to form intersected laterally open chambers, the intersected laterally open chambers being completed by rim-bordering side walls of adjacent grid plates to additional laterally closed chambers, the rim-bordering side walls of adjacent grid plates being in contact only along vertical edges of the side walls intersected by the plate rim.

2. A grid plate as defined in claim 1, in which the plate rim intersects all rim-bordering side walls each forming laterally open partial chambers, the partial chambers of adjacent grid plates each forming an additional chamber.

3. A grid plate as defined in claim 1, wherein along plate rims of adjacent grid plates of a chamber closed by side walls of one grid plate an intersected chamber of the adjacent grid plate faces which is formed into a closed chamber by a rim bordering side wall of the one grid plate, the chambers between these chambers being formed by partial chambers of the pair of grid plates.

4. A grid plate as defined in claim 2, further comprising chambers formed of honeycomb sections, wherein in rim-bordering chambers with side walls which are parallel tot he plate rim, the plate rim intersects the sides walls extending diagonally thereto at a distance from the side walls which are parallel to the plate rim.

5. A grid plate as defined in claim 2, further comprising chambers formed of honeycomb sections, wherein in rim-bordering chambers with side walls extending vertically to the plate rim, the plate rim intersects the side walls extending diagonally thereto at a distance from the side walls extending vertically to the plate rim.

6. A grid plate as defined in claim 4, further comprising chambers formed of honeycomb sections, wherein in rim-bordering chambers with side walls extending vertically to the plate rim, the plate rim intersects the side walls extending diagonally thereto at a distance from the side walls extending vertically to the plate rim.

7. A grid plate as defined in claim 4, large and small partial chambers alternating on the plate rim, small partial chambers completing large partial chambers in a pair of adjacent grid plates.

8. A grid plate as defined in claim 5, large and small partial chambers alternating on the plate rim, and small partial chambers completing large partial chambers in a pair of adjacent grid plates.

9. A grid plate according to claim 6, large and small partial chambers alternating on the plate rim, and small partial chambers completing large partial chambers in a pair of adjacent grid plates.

10. A grid plate as defined in claim 19, in which the projections are located on alternate partial chambers.

11. A grid plate as defined in claim 7, the projections on the large partial chambers being contoured to match the shape of a small partial chamber completing a large partial chamber.

12. A grid plate as defined in claim 7, the projections on the small partial chambers expanding conically from their base and having slots into which the rim-bordering ends of the side walls of the adjacent grid plate engage.

13. A grid plate as defined in claim 1, each drainage hole being surrounded by a vertical wall the height of which is less than that of the side walls.

14. A grid as defined in claim 8, the projections on the large partial chambers being contoured to match the shape of a small partial chamber completing a large partial chamber.

15. A grid plate as defined in claim 9, the projections on the large partial chambers being contoured to match the shape of a small partial chamber completing a large partial chamber.

16. A grid plate as defined in claim 8, the projections on the small partial chambers expanding conically from their base and having slots into which the rim-bordering ends of the side walls of the adjacent grid plate engage.

17. A grid plate as defined in claim 9, the projections on the small partial chambers expanding conically from their base and having slots into which the rim-bordering ends of the side walls of the adjacent grid plate engage.

* * * * *